United States Patent Office 3,492,241
Patented Jan. 27, 1970

3,492,241
METHOD FOR PURIFYING PHOSPHORS
Arthur C. La Tulip, Seneca Falls, N.Y., James E. Mathers, Ulster, Pa., and John G. Warner, Seneca Falls, N.Y., assignors to Sylvania Electric Products Inc., a corporation of Delaware
No Drawing. Filed Sept. 23, 1968, Ser. No. 761,864
Int. Cl. C09k 1/00; B08b 7/00
U.S. Cl. 252—301.4         3 Claims

ABSTRACT OF THE DISCLOSURE

A novel method for removing copper contamination from the particle surface of rare earth metal-type phosphors. The method involves heating the phosphors in the presence of zinc sulfide to cause migration or diffusion of the contaminant into the zinc sulfide lattice and separating the copper-zinc sulfide product from the phosphor.

BACKGROUND OF THE INVENTION

Field of the invention

This invention relates to phosphors. More precisely, the invention disclosed herein relates to a method for removing copper contaminants from phosphors.

Description of the prior art

Copper contamination of phosphors is a vexatious problem long outstanding in the art. It comes from pipe fittings, welds in the system and impurities in the water and air. It is especially apparent in those systems wherein multiple phosphors are involved and one or more phosphor has a host matrix comprising zinc sulfide. In such situations, the low temperature migration of copper into the zinc sulfide matrix can occur to produce coactivation thereby altering the spectral response of the zinc sulfide containing phosphor.

The problem of copper contamination particularly manifests itself in the production of conventional color television tubes. As those skilled in the art know, color television tubes employ a mosaic screen consisting of symmetrically placed "dots" of blue, green and red emitting phosphors. Moreover, as those in the art know, the blue emitting phosphor is generally silver activated zinc sulfide. Accordingly, if the green and/or red emitting phosphors are contaminated with copper, coactivation of the silver activated zinc sulfide can and does occur. In such an event, the "blue dot" has altered spectral properties with total spectral energy distribution shifted to longer wave lengths to produce an undesirable greenish-blue emitting component.

In the present methods for producing color television tubes, a common source of copper contamination is the red emitting phosphor. The red emitting phosphors most frequently employed include, among others, those having a host matrix of a vanadate, oxide or oxysulfide of yttrium or gadolinium activated by europium alone or with bismuth. The phosphors are expensive and therefore are salvaged and reclaimed. More often than not however, the reclaimed phosphors are contaminated with greater than about five parts per million copper, a sufficient concentration to adversely affect the overall quality of the blue phosphor field because of migration and diffusion of the copper during tube manufacturing heat treatment.

SUMMARY OF THE INVENTION

In accordance with the practice of the present invention, a relatively simple but highly reliable process is presented for removing copper contamination from the particle surface of phosphors. The process is broadly applicable to copper contaminated phosphors having host matrices and activator systems which will not interact with copper or zinc sulfide at temperatures below about 1000° C. The process involves two essential steps. In the first step a mixture of zinc sulfide and a copper contaminated phosphor are heated at a temperature sufficient to cause the combination of the copper and the zinc sulfide. Such combination occurs when the copper enters the crystal lattice of the zinc sulfide. In the second step of the process, the phosphor, now essentially free of particle surface copper contamination, is separated from the copper-zinc sulfide product.

DESCRIPTION OF THE PREFERRED EMBODIMENT

As stated, the present invention is applicable to copper contaminated phosphors of the host matrices and activator systems which will not interact to any appreciable extent with copper or zinc sulfide at the heating temperatures employed. A suitable method for evaluating the applicability of the present invention to a particular copper contaminated phosphor involves exposing a thin film of an efficient blue-emitting silver-activated zinc sulfide to 3650 A. ultraviolet light. The film can be deposited on a suitable substrate such as a glass slide. The copper contaminated phosphor is then applied to the sulfide coated slide and the slide is heated at about 500° C. for a period of about 14 minutes. The slide is then cooled to room temperature and the originally copper contaminated phosphor is removed, (gently shaken or blown off slide); it is then examined under 3650 A. irradiation for shift in blue response. Any observable shift indicates that the copper contaminated phosphor can adversely affect the spectral response of a phosphor comprising a zinc sulfide matrix if used in combination therewith.

In accordance with the practice of the present invention a mixture of a copper contaminated phosphor and zinc sulfide is heated at a temperature sufficient to cause combination or interaction of the copper with zinc sulfide. The amount of zinc sulfide mixed with the copper contaminated phosphor is not in itself especially critical. However, since the phosphor is ultimately removed from the copper-zinc sulfide product, it is best to minimize the amount of zinc-sulfide employed. Obviously, the minimum amount must be at least sufficient to combine with substantially all of the copper under the conditions of heating. In general, the amount of zinc sulfide can vary between 0.1 to about 10% by weight of the mixture. Also, the heating temperature employed can vary but excessively high temperatures which could adversely affect the properties of the phosphor should be avoided unless the residence time at the temperature is short. Generally, temperatures between about 300° C. to about 700° C. are suitable. Also, the mixture can be heated at the elevated temperatures while in the form of a fixed or fluidized bed.

After the mixture of the copper-contaminated phosphor is heated, the phosphor is separated from the copper-zinc sulfide product. The particular method for separating the phosphor and the product of the combination of the copper contaminant and zinc sulfide is not in itself especially critical. The method employed will depend primarily on the phosphor involved. For example, separation can be achieved by way of mechanical techniques such as flotation. A more convenient method however involves separately dissolving the phosphor or the copper-zinc sulfide product in a suitable solvent.

The invention and manners of practicing same will be better understood by reference to the following example. It is to be understood that the example is illustrative in nature and in no way should it be construed so as to limit the invention beyond those limitations expressly set forth

Example I

A dry mixture of copper contaminated red-emitting europium activated vanadate and/or oxide phosphor having about 10 p.p.m. copper particle surface contamination and about 5% by weight unactivated luminescent grade zinc sulfide is ignited at 525° C. for sixty minutes. The heat treated mixture is then slurried in 10% solution of a mineral acid (such as hydrochloric or nitric acid) at from 25° C.–60° C. for a period of 60 minutes in order to free the red-emitting phosphor from the copper-zinc sulfide product. The solids are then washed by decantation with deionized water. Finally, the recovered red-emitting phosphor is filtered and dried at 120° C. and passed through a 325 mesh sieve. It has been found that this procedure results in almost complete removal of copper from the surface of the red-emitting phosphor and that the recovered phosphor has essentially the same luminescent properties as the original composition.

Many modifications of the details offered in the above example for the purposes of illustrating the invention will be apparent to those skilled in the art. Such modifications can be employed without departing from the spirit and scope of the invention defined in the appended claims.

We claim:

1. A method for removing copper contamination from the particle surfaces of phosphors which comprise the steps of: admixing zinc sulfide with copper contaminated phosphor particles, said phosphor particles being activated by a rare earth metal and having a matrix of the oxide and/or vanadate and/or oxysulfide of yttrium and/or gadolinium; heating the mixture at a temperature sufficient to cause said copper to migrate into the crystal lattice of said zinc sulfide; and then separating said phosphor from the combination of copper and zinc sulfide.

2. The method of claim 1 wherein said temperature is between about 300° C. to about 700° C.

3. The method according to claim 1 or 2 wherein the quantity of zinc sulfide is between 0.1 to 10% by weight of the total mixture.

References Cited

UNITED STATES PATENTS 3,348,924  10/1967  Levine et al. _____ 252—301.4

ROBERT D. EDMONDS, Primary Examiner